United States Patent [19]

Dubois et al.

[11] 4,212,762
[45] Jul. 15, 1980

[54] LIQUID CRYSTAL MATERIALS HAVING A FORMULA CONTAINING A DIPHENYLETHANE NUCLEUS

[75] Inventors: Jean-Claude Dubois; Huu Tinh Nguyen; Annie Zann, all of Paris, France

[73] Assignee: Thomson-CSF, Paris, France

[21] Appl. No.: 962,692

[22] Filed: Nov. 21, 1978

[30] Foreign Application Priority Data

Nov. 24, 1977 [FR] France ................ 77 35357

[51] Int. Cl.$^2$ .............. C07C 69/76; C07C 121/60; C09K 3/34
[52] U.S. Cl. .............. 252/299; 260/465 D; 560/73; 560/108; 568/744; 568/745; 350/350 S; 568/315; 568/323; 568/331
[58] Field of Search .......... 260/465 D; 560/73, 108; 252/299

[56] References Cited

U.S. PATENT DOCUMENTS

| | | | |
|---|---|---|---|
| 4,035,056 | 7/1977 | Coates et al. | 260/465 D X |
| 4,065,489 | 12/1977 | Steinstrasser et al. | 560/73 |
| 4,112,239 | 9/1978 | Dubois et al. | 560/73 |

FOREIGN PATENT DOCUMENTS

2544577  6/1976  Fed. Rep. of Germany .

OTHER PUBLICATIONS

Nash et al., Mol Cryst. Liq. Cryst., vol. 25 pp. 299–321 (1974).
Blackwell et al., J. Chem. Soc., pp. 366–373 (1963).

*Primary Examiner*—Dolph H. Torrence
*Attorney, Agent, or Firm*—Oblon, Fisher, Spivak, McClelland & Maier

[57] ABSTRACT

Novel mesomorphic substances, constituting, in certain temperature ranges, nematic or smectic liquid crystals which are compounds of the formula:

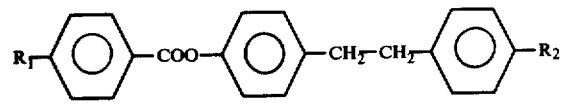

wherein
$R_1$ is an alkyl or alkoxy group containing 1 to 10 atoms of carbon;
$R_2$ is Br, CN or an alkyl (or an alkoxy) group containing 1 to 10 atoms of carbon.

7 Claims, No Drawings

LIQUID CRYSTAL MATERIALS HAVING A FORMULA CONTAINING A DIPHENYLETHANE NUCLEUS

The invention concerns new liquid crystal materials exhibiting advantageous properties from the user's point of view for manufacturing display devices.

It is known that the liquid crystals which enable such devices to be embodied use more particularly molecular structures of the helical nematic type, and/or having variable double refraction, and smectic structures enabling memory display devices to be carried out, either by the field effect or the thermo-optical effect.

For use in display devices liquid crystals having a generally positive dielectric anisotropy, and which are stable over as broad as possible a temperature range, are sought.

The invention aims more particularly at enabling these objectives to be attained.

According to the invention, there is provided liquid crystal materials comprising at least one compound of the formula:

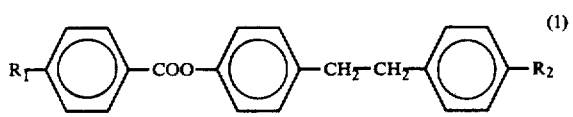

wherein $R_1$ represents an alkyl or alkoxy group having n carbon atoms (n being an integer from 1 to 10), and $R_2$ represents an alkyl group having m carbon atoms (m being an integer from 1 to 10), or bromine or the cyanine group.

Hereinafter are given the general process for manufacturing these substances: examples of the operational method concerning the different steps of synthesis, and finally the mesomorphic properties of some of these materials and of mixtures of these materials according to the invention with a known mesomorphic substance.

GENERAL PROCESS FOR MANUFACTURING A LIQUID CRYSTAL MATERIAL ACCORDING TO THE INVENTION

First case: $R_2 = C_mH_{2m+1}$ or Br (a) para-substituted phenol is synthesised starting from para-methoxyphenylacetic acid chloride. The process comprises three steps:

Step 1.1.: A Friedel and Crafts' reaction is carried out between said acid chloride and an alkybenzene or bromobenzene:

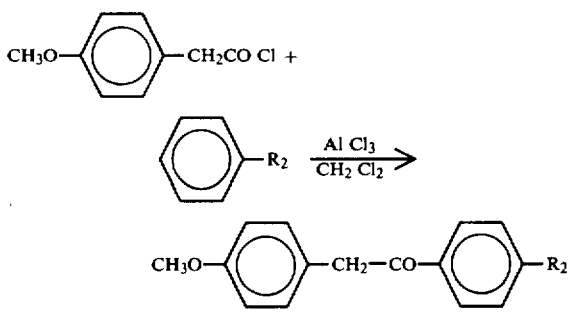

Step 1.2.: the product obtained in the preceding step is demethylated:

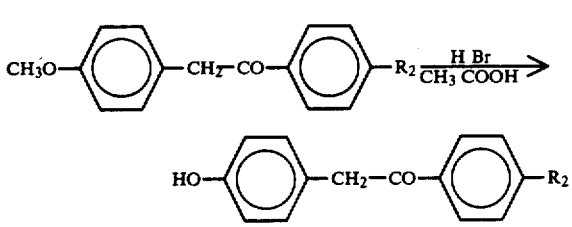

Step 1.3.: the product obtained in the preceding step is reduced by the Wolff-Kishner reaction

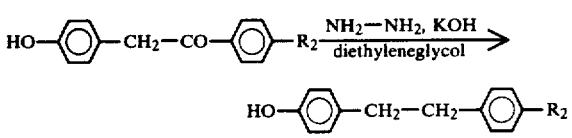

The para-substituted phenol thus obtained is 4-hydroxy-4'-alkyl-phenylethane or 4-hydroxy-4'-bromo-phenylethane.

(b) the chloride of a substituted p-benzoic acid is esterified with $R_1$ (alkyl or alkoxy), which gives a material according to the invention:

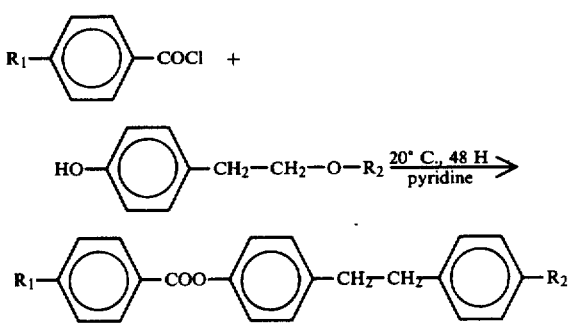

Second case: $R_2 = C \equiv N$

A start is made from the same chloride of p-benzoic acid as in the first case, and the same series of reactions is carried out, taking the case in which $R_2 = Br$ in order to obtain a brominated compound.

The bromine in the compound obtained is replaced by pro-nuclear substitution in accordance with the following reaction:

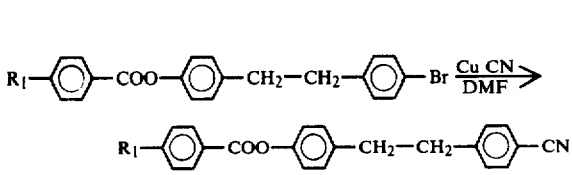

wherein DMF represents dimethylformamide.

EXAMPLES OF OPERATIONAL METHODS

Step 1.1: Synthesis of

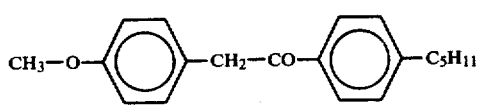

(4-methoxy-4'-pentyl-deoxybenzoine)

350 ml of $CH_2Cl_2$ and 67 g of $AlCl_3$ (0.5 mole) are charged by small fractions into a one-liter reactor. The contents of the reactor are stirred then cooled below 5° C. A mixture containing 45 g of pentylbenzene (about 0.3 mole), 55 g (0.35 mole) of

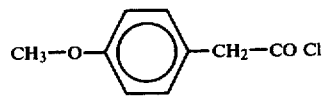

and 250 ml of $CH_2Cl_2$ is poured drop by drop, stirring constantly, for an hour and a half. The mixture is then allowed to react at ambient temperature for two hours, and next heated in reflux in order to perfect the reaction for one hour. The mixture is thereupon allowed to cool to ambient temperature, and then poured into a mixture containing 180 g of ice, 180 ml of demineralized water and 180 ml of concentrated HCl. The liquid is poured off. The aqueous solution is washed twice with chloroform. The organic fractions are placed together and washed with water until neutral. The organic solution is dried on anhydrous $Na_2SO_4$, and the solvent is evaporated on a rotary evaporator. The product is recrystallised in 120 ml of ethanol. 56.2 g of product which melts at 62° C. are obtained. The molar efficiency is about 63%.

Step 1.2.: Synthesis of

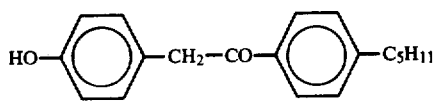

(4-hydroxy-4'-pentyldeoxybenzoine 9 g (0.03 mole) of

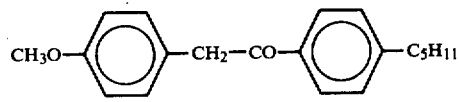

are dissolved in 100 ml of acetic acid, and then 150 ml of 48% H Br are added. The whole is maintained in reflux for 7 jours. The mixture is allowed to cool to ambient temperature, and then poured into a mixture of 100 g of water and 100 g of ice. Stirring is carried out for half an hour. Filtering is carried out, and chromatography is performed on silica with 50%–50% benzene-hexane as an eluent. 1.2 g of starting product are obtained, and 5.4 g of desired product which melts at 112° C. The molar efficiency is about 73%.

Step 1.3.: Synthesis of

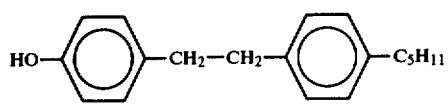

1-(4-hydroxyphenyl) 2-(4'-pentylphenyl) ethane 3 g of hydrazine, 10 ml of diethylene glycol and 4 g of KOH are charged into a 100 ml Erlenmeyer flask. 4.5 g (0.016 mole) of:

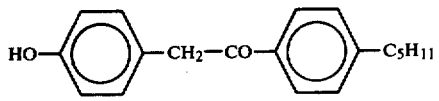

are then added.

The mixture is heated in reflux for an hour by means of a Dean and Stark apparatus and a cooler. Approximately 3 ml of solvent are distilled, and the temperature is kept at 230° C. for 3 hours. After cooling, the mixture is neutralised with a solution of 5 ml of concentrated HCl in 50 ml of cold water. Stirring is carried out for half an hour; the organic fraction is then extracted with 150 ml of benzene. Said organic fraction is dried on anhydrous $Na_2SO_4$, the solvent is evaporated, and chromatography is performed on silica with the benzene as eluent. 2.7 g of product which melts at 102° C. are obtained. The molar efficiency is 63%.

STEP (a) OF ESTERIFICATION

First example: $R_1 = C_8H_{17}O$ and $R_2 = C_5H_{11}$

Synthesis of

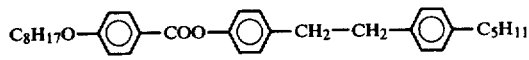

1-(4'-octyloxybenzoyloxy) phenyl-2-(4-pentylphenyl) ethane 540 mg ($\simeq$0.002 mole) of

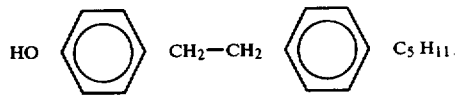

and 600 mg ($\simeq$0.0024 mole) of octyloxybenzoic acid chloride are charged in a reactor containing 10 ml of pyridine and kept at ambient temperature for 48 hours. The reaction mixture is then poured into a solution containing 10 ml of concentrated $H_2SO_4$ and 100 g of ice. The organic fraction is extracted three times with ether then washed three times with water and finally dried on anhydrous $Na_2SO_4$. The solvent is evaporated and the product is recrystallised three times in a mixture of 50% benzene and 50% hexane. 800 mg of product are obtained. The molar efficiency is 80%.

Second example: $R_1 = C_8H_{17}O$ and $R_2 = Br$

Synthesis of

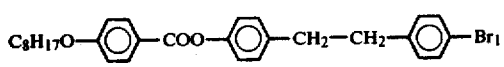

(4'-octyloxybenzoyloxy) phenyl-2-(4-bromophenyl) ethane 1 g ($\simeq$0.0036 mole) of

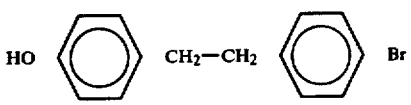

and 1 g ($\simeq$0.0040 mole) of octyloxybenzoic acid chloride are charged in a reactor containing 10 ml of pyridine and kept at ambient temperature for 48 hours. The reaction mixture is then poured into a solution containing 10 ml of concentrated $H_2SO_4$ and 100 g of ice. The organic solution is extracted three times with water and finally dried on anhydrous $Na_2SO_4$. The solvent is evaporated and the product is recrystallised three times in ethanol. 1.6 g of product are obtained. The molar efficiency is 85%.

STEP OF SUBSTITUTING THE CYANINE GROUP FOR THE BROMINE GROUP

Case of $R_1 = C_8H_{17}$

Synthesis of

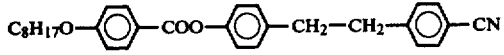

(4'-octyloxybenzoyloxy) phenyl-2-(4-cyanophenyl) ethane

The following are successively charged into an Erlenmeyer flask: 0.24 g ($\simeq$0.0027 mole) of CuCN, 1.5 ml of dimethylformamide (DMF) and 1 g (>0.002 mole) of 1-(4'-octyloxybenzoyloxy) phenyl-2-(4-bromophenyl) ethane. The whole is brought to 160° C. fot six hours while stirring briskly. The mixture is then allowed to cool to ambient temperature. It is poured into a solution of 0.7 g of ethylene diamine in 10 ml of water. It is stirred again for an hour. Benzene is poured into the solution in order to dissolve and extract the cyano product. Filtering is carried out on infus orial earth. The liquid is poured off. The aqueous fraction is washed with benzene. The organic fractions are placed together. They are washed with water until neutral. Drying is carried out on anhydrous $Na_2SO_4$. The solvent is evaporated, and chromatography is performed on a column with the mixture of 50% benzene and 50% hexane as an eluent. The product obtained is recrystalised in this mixture of solvents. 600 mg of product are obtained. The molar efficiency is 66%.

MESOMORPHIC PROPERTIES OF THE MATERIALS ACCORDING TO THE INVENTION

Table I (a) gives the properties of materials wherein:

$R_1 = C_nH_{2n+1} R_2 = C_5H_{11}$

The temperatures appearing in the table are expressed in degrees Celsius.

TABLE I (a)

| n | K | S | $S_B$ | N | I |
|---|---|---|---|---|---|
| 3 | . 73 | — | — | . 113 | . |
| 5 | . 55 | — | . 75 | . 110 | . |
| 6 | . 67 | . 73.5 | . 84 | . 103 | . |
| 7 | . 33.5 | . 65 | . 88 | . 106,5 | . |
| 8 | . 31 | . 52 | . 92 | . 102,5 | . |

The legend of the signs used in this table and in the following ones is as follows:

K: crystalline phase
S: smectic (s) phase (s) $S_A$, $S_B$, $S_C$: smectic phases A, B, C
N: nematic phase
I: isotropic liquid phase
.: phase exists
-: phase does not exist Table I (b) gives the properties of materials wherein:

$R_1 = C_nH_{2n+1}OR_2 = C_5H_{11}$

TABLE I (b)

| n | K | S | $S_C$ | N | I |
|---|---|---|---|---|---|
| 1 | . 95 | — | — | — | . 135 . |
| 4 | . 86 | — | — | — | . 138 . |
| 7 | . 69 | . (69) | . 81 | . 128 . |
| 8 | . 63 | . 70.5 | . 95 | . 130 . |

In this table, as in the following ones, the temperatures indicated in brackets correspond to metastable transitions.

Table II(a) gives the the properties of materials wherein:

$R_1 = C_nH_{2n+1}R_2 = Br$

TABLE II(a)

| n | K | S | $S_B$ | I |
|---|---|---|---|---|
| 3 | . 126 | . 132 | . 144 . |
| 5 | . 128 | . 131 | . 151 . |
| 6 | . 98 | . 110 | . 143 . |
| 7 | . 100 | . 110 | . 144 . |
| 8 | . 84 | . 104 | . 143 . |

Table II(b) gives the properties of materials wherein:

$R_1 = C_nH_{2n+1}OR_2 = Br$

TABLE II(b)

| n | K | S | $S_A$ | N | I |
|---|---|---|---|---|---|
| 1 | . 147 | — | — | . 162 . |
| 2 | . 163 | — | — | . 171 . |
| 4 | . 132 | — | — | . 164 . |
| 7 | . 96 | . 137 | . 154 | . 155 . |
| 8 | . 94 | . 136 | . 156 | — — . |

Table III(a) gives the properties of materials wherein:

$R_1 = C_nH_{2n+1}R_2 = C \uparrow N$

TABLE III (a)

| n | K | $S_A$ | N | I |
|---|---|---|---|---|
| 3 | 115 | — | . | 166 |
| 5 | 121 | — | . | 158 |
| 6 | 100.5 | — | . | 150 |
| 7 | 89 | — | . | 150 |
| 8 | 92 | . 96 | . | 144 |

Table III (b) gives the properties of materials wherein:

$R_1 = C_nH_{2n+1}O R_2 = C \equiv N$

TABLE III (b)

| n | K | N | I |
|---|---|---|---|
| 1 | 168 | . 199 | . |
| 2 | 144 | . 199 | . |
| 4 | 108 | . 185 | . |
| 7 | 83 | . 169 | . |
| 8 | 85 | . 166 | . |

PROPERTIES OF MIXTURES OF MATERIALS ACCORDING TO THE INVENTION WITH A KNOWN MESOMORPHIC SUBSTANCE.

Hereinafter are given the so-called "parallel" ($\epsilon \parallel$) and "perpendicular" ($\epsilon \perp$) dielectric constants, as well as their difference, of the following products:

B: para-metoxy benzoate of parapentylphenol in the mesomorphic state (by superfusion at 26° C.);

$M_1$, $M_2$ and $M_3$: mixtures containing 9/10 in moles of the substance B and 1/10 in moles of one of the following materials.

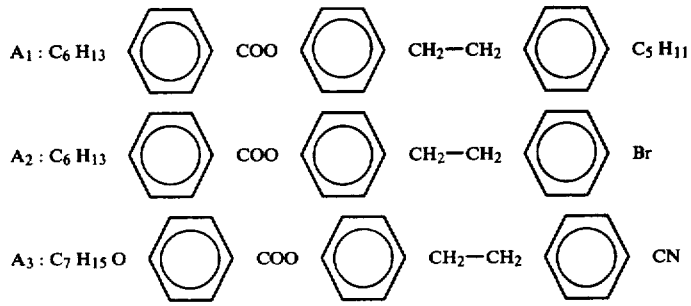

Table IV gives the constants $\epsilon \parallel$ and $\epsilon \perp$, as well as their difference ($\epsilon \parallel - \epsilon \perp$) or dielectric anisotropy $\epsilon_a$, positive in the present case. The measurements are taken at 26° C. in an orientating magnetic field of 10,000 oersteds. The measurement frequency is 2,000 Hz.

TABLE IV

| PRODUCT | $\epsilon/\parallel$ | $\epsilon \perp$ | $\epsilon_a = \epsilon \parallel - \epsilon \perp$ |
|---|---|---|---|
| B | 5.7 | 5.6 | 0.1 |
| $M_1 = A_1/B$ | 3.16 | 3.08 | +0.08 |
| $M_2 = A_2/B$ | 5.45 | 4.8 | +0.65 |
| $M_3 = A_3/B$ | 7.4 | 5.3 | +2.1 |

Mixtures containing the substance B in a proportion of 85 to 95% in moles, the remainder consisting of 5 to 15% of material $A_1$ or $A_2$ or $A_3$, would exhibit similar properties. When the measurement frequency is varied, a reduction in the "parallel" dielectric constant is observed in the region of 80 KHz in the case of mixture $M_1$, 60 KHz in the case of mixture $M_2$, and 53 KHz in the case of mixture $M_3$.

Besides the applications already indicated, the following uses may be mentioned:

of the substances of table III, in pure form or in a mixture between themselves or with other mesomorphic substances, in field-effect display devices; this involves nematic mesophases, with a large positive dielectric anisotropy in this particular case;

of smectic mesophases at close to ambient temperature (more particularly case of the substances of table Ia) in memory display devices.

What we claim is:

1. Liquid crystal materials comprising at least one compound of the formula:

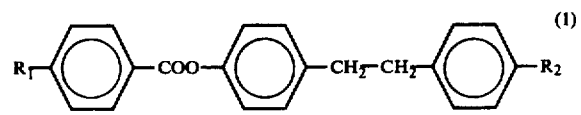

wherein $R_1$ represents an alkyl or alkoxy group having n carbon atoms (n being an integer from 1 to 10), and $R_2$ represents an alkyl group having m carbon atoms (m being an integer from 1 to 10), or bromine or the cyanine group.

2. Liquid crystal materials according to claim 1, wherein:
   $R_1 = C_3H_7$, $C_5H_{11}$, $C_6H_{13}$, $C_7H_{15}$ or $C_8H_{17}$;
   $R_2 = C_5H_{11}$.

3. Liquid crystal materials according to claim 1, wherein:
   $R_1 = CH_3O$, $C_4H_9O$, $C_7H_{15}O$ or $C_8H_{17}O$;
   $R_2 = C_5H_{11}$.

4. Liquid crystal materials according to claim 1, wherein:
   $R_1 = C_3H_7$, $C_5H_{11}$, $C_6H_{13}$, $C_7H_{15}$ or $C_8H_{17}$;
   $R_2 = Br$ or $CN$.

5. Liquid crystal materials according to claim 1, wherein:
   $R_1 = CH_3O$, $C_2H_5O$, $C_4H_9O$, $C_7H_{15}O$ or $C_8H_{17}O$;
   $R_2 = Br$ or $CN$.

6. Liquid crystal materials comprising at least one liquid crystal material according to claim 1, mixed with para-methoxybenzoate of parapentyl phenol.

7. Liquid crystal materials according to claim 6, wherein said materials represents 5 to 15 percent in moles of said mixture.

* * * * *

UNITED STATES PATENT AND TRADEMARK OFFICE
CERTIFICATE OF CORRECTION

PATENT NO. : 4,212,762
DATED : July 15, 1980
INVENTOR(S) : JEAN-CLAUDE DUBOIS ET AL It is certified that error appears in the above—identified patent and that said Letters Patent is hereby corrected as shown below:

Column 2, line 41, the formula should read as follows:

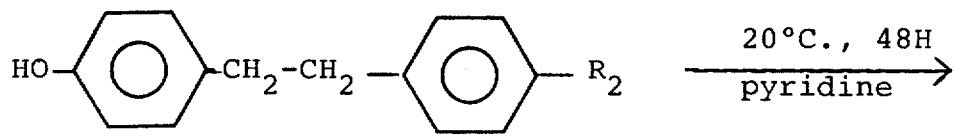

Signed and Sealed this

Tenth Day of February 1981

[SEAL]

*Attest:*

RENE D. TEGTMEYER

*Attesting Officer*     *Acting Commissioner of Patents and Trademarks*